United States Patent
Gollapudi et al.

(10) Patent No.: US 12,549,091 B2
(45) Date of Patent: Feb. 10, 2026

(54) SYSTEMS AND METHODS FOR DISCHARGING ENERGY STORAGE DEVICES

(71) Applicant: GE GRID GMBH, Frankfurt am Main (DE)

(72) Inventors: Datatreya Reddy Gollapudi, Chennai (IN); Kamran Jalili, Berlin (DE); Olaf Balk, Brandenburg (DE)

(73) Assignee: GE GRID GMBH, Frankfurt am Main (DE)

( * ) Notice: Subject to any disclaimer, the term of this patent is extended or adjusted under 35 U.S.C. 154(b) by 0 days.

(21) Appl. No.: 18/720,895

(22) PCT Filed: Dec. 19, 2022

(86) PCT No.: PCT/EP2022/086635
§ 371 (c)(1),
(2) Date: Jun. 17, 2024

(87) PCT Pub. No.: WO2023/117890
PCT Pub. Date: Jun. 29, 2023

(65) Prior Publication Data
US 2025/0062681 A1   Feb. 20, 2025

(30) Foreign Application Priority Data
Dec. 20, 2021   (IN) .............................. 202141059305

(51) Int. Cl.
*H02M 1/32* (2007.01)
*H02J 3/00* (2006.01)
(Continued)

(52) U.S. Cl.
CPC ............. *H02M 1/322* (2021.05); *H02J 3/001* (2020.01); *H02J 3/38* (2013.01); *H02M 7/487* (2013.01); *H02J 2300/24* (2020.01)

(58) Field of Classification Search
CPC ........ H02M 1/322; H02M 7/487; H02J 3/001; H02J 3/38; H02J 2300/24; Y02E 10/56
See application file for complete search history.

(56) References Cited

U.S. PATENT DOCUMENTS

| | | | |
|---|---|---|---|
| 2002/0126517 A1* | 9/2002 | Matsukawa | H02M 3/33584 363/69 |
| 2013/0234510 A1* | 9/2013 | Nakamura | B60L 3/0007 307/10.1 |
| 2016/0099664 A1 | 4/2016 | Niwa | |

FOREIGN PATENT DOCUMENTS

| | | | |
|---|---|---|---|
| CN | 205490114 U | 8/2016 | |
| CN | 110311584 A * | 10/2019 | ............. H02J 3/383 |

(Continued)

OTHER PUBLICATIONS

PCT International Search Report and Written Opinion, Application No. PCT/EP2022/086635, dated Mar. 16, 2023, 11 pages.

*Primary Examiner* — Rexford N Barnie
*Assistant Examiner* — Thai H Tran
(74) *Attorney, Agent, or Firm* — Armstrong Teasdale LLP

(57) ABSTRACT

A power converter system is provided. The power converter system includes an energy storage device electrically coupled to a direct current (DC) power source and configured to store electrical energy received from the DC power source, an inverter electrically coupled to the energy storage device, and a pulse width modulation (PWM) filter electrically coupled to the inverter and including a resistor inductor capacitor (RLC) circuit. The power converter system further includes a controller coupled in communication with the inverter and configured to, in an active mode, cause the inverter to convert a DC power signal received from the energy storage device to an alternating current (AC) power signal at an output node of the PWM filter, and in a fast discharge mode, pulse the inverter to cause the DC power (Continued)

Figure 1:
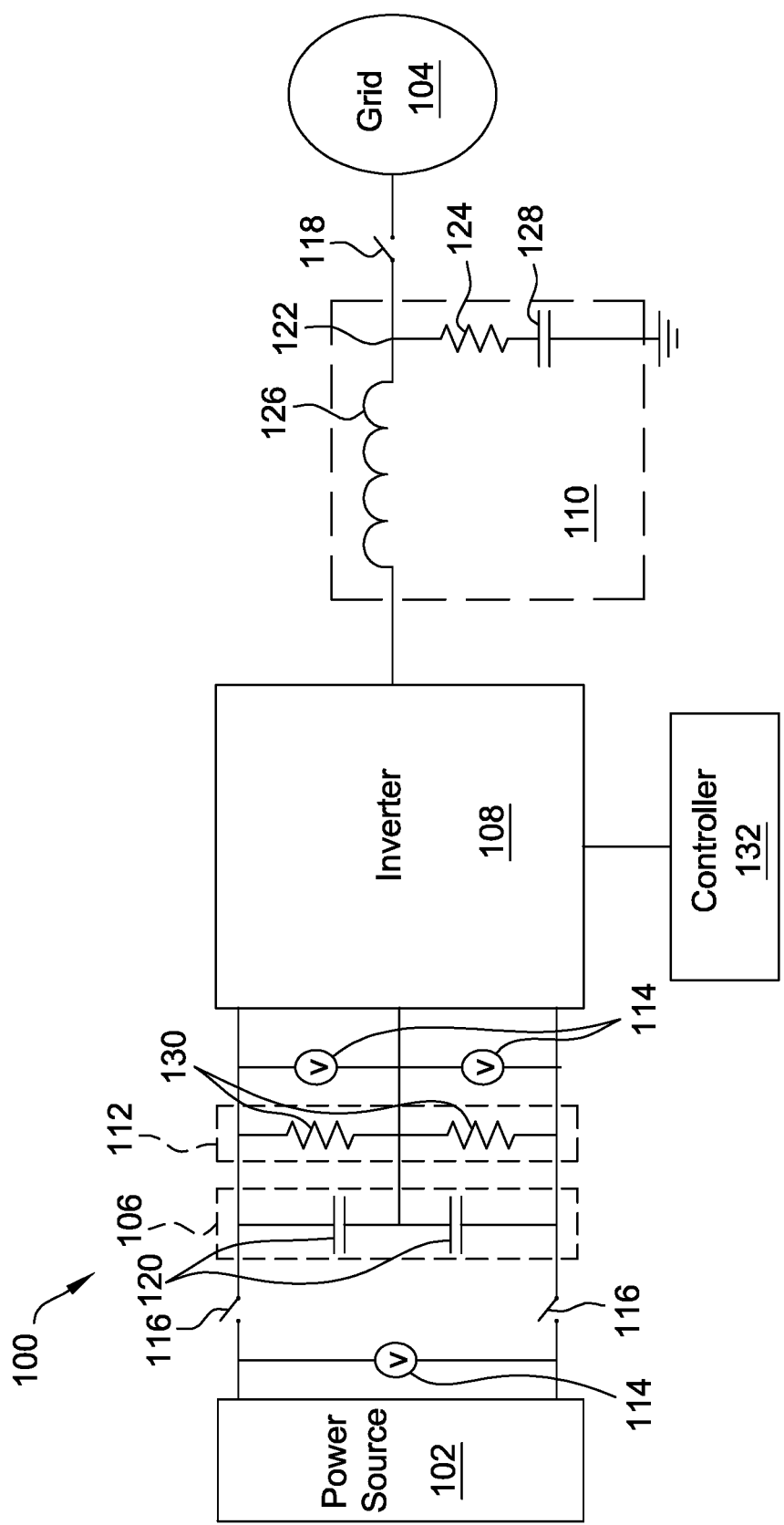

signal to be dissipated by the RLC circuit of the PWM filter, substantially discharging the energy storage device.

18 Claims, 2 Drawing Sheets

(51) Int. Cl.
  *H02J 3/001* (2026.01)
  *H02J 3/38* (2006.01)
  *H02M 7/487* (2007.01)

(56) References Cited

FOREIGN PATENT DOCUMENTS

| | | |
|---|---|---|
| CN | 110311584 B | 2/2021 |
| WO | 2021192145 A1 | 9/2021 |

* cited by examiner

SYSTEMS AND METHODS FOR DISCHARGING ENERGY STORAGE DEVICES

CROSS-REFERENCE TO RELATED APPLICATIONS

This application is a national stage application of PCT/EP2022/086635, filed on Dec. 19, 2022 and titled "SYSTEMS AND METHODS FOR DISCHARGING ENERGY STORAGE DEVICES", which claims priority to non-provisional patent application No. 202141059305, filed in INDIA on Dec. 20, 2021 and titled "SYSTEMS AND METHODS FOR DISCHARGING ENERGY STORAGE DEVICES", which is hereby incorporated by reference in its entirety.

BACKGROUND

The field of the invention relates generally to energy storage devices, and more particularly, to systems and methods for discharging energy storage devices.

Photovoltaic, solar, and battery energy storage systems generally include a power converter system that converts direct current (DC) power produced by the photovoltaic, solar, or battery energy storage system into alternating current (AC) power that may be provided to, for example, a power grid. Some such power converter systems include an energy storage device, such as a capacitor or bank of capacitors, and an inverter that converts DC power provided by the energy storage device into AC power. In some implementations, the energy storage device may have a relatively high voltage during operation, such as 1500 volts. If a fault occurs, or maintenance needs to be performed on the power converter system, the energy storage device generally must be discharged, for example, to less than 50 volts, before personnel can safely operate on the power converter system. This discharge process may take a significant amount of time, unless additional fast discharge circuitry is added to the power converter system. However, fast discharge circuitry may increase the cost of the power converter system. An improved power converter system is therefore desirable.

BRIEF DESCRIPTION

In one aspect, a power converter system is provided. The power converter system includes an energy storage device electrically coupled to a DC power source. The energy storage device is configured to store electrical energy received from the DC power source. The power converter system further includes an inverter electrically coupled to the energy storage device. The power converter system further includes a pulse width modulation (PWM) filter electrically coupled to the inverter. The PWM filter includes a resistor inductor capacitor (RLC) circuit. The power converter system further includes a controller coupled in communication with the inverter. The controller is configured to, in an active mode, cause the inverter to convert a DC power signal received from the energy storage device to an AC power signal at an output node of the PWM filter. The controller is further configured to, in a fast discharge mode, pulse the inverter to cause the DC power signal to be dissipated by the RLC circuit of the PWM filter, substantially discharging the energy storage device.

In another aspect, a method for discharging an energy storage device is provided. The method is performed by a power converter system including an energy storage device electrically coupled to a DC power source and configured to store electrical energy received from the DC power source, an inverter electrically coupled to the energy storage device, and a PWM filter electrically coupled to the inverter and including an RLC circuit. The method includes, in an active mode, causing the inverter to convert a DC power signal received from the energy storage device to an AC power signal at an output node of the PWM filter. The method further includes, in a fast discharge mode, pulsing the inverter to cause the DC power signal to be dissipated by the RLC circuit of the PWM filter, substantially discharging the energy storage device.

In another aspect, a controller for a power converter system is provided. The power converter system includes an energy storage device electrically coupled to a DC power source and configured to store electrical energy received from the DC power source, an inverter electrically coupled to the energy storage device, and a PWM filter electrically coupled to the inverter and including an RLC circuit. The controller is configured to, in an active mode, cause the inverter to convert a DC power signal received from the energy storage device to an AC power signal at an output node of the PWM filter. The controller is further configured to, in a fast discharge mode, pulse the inverter to cause the DC power signal to be dissipated by the RLC circuit of the PWM filter, substantially discharging the energy storage device.

DRAWINGS

Figure 2:
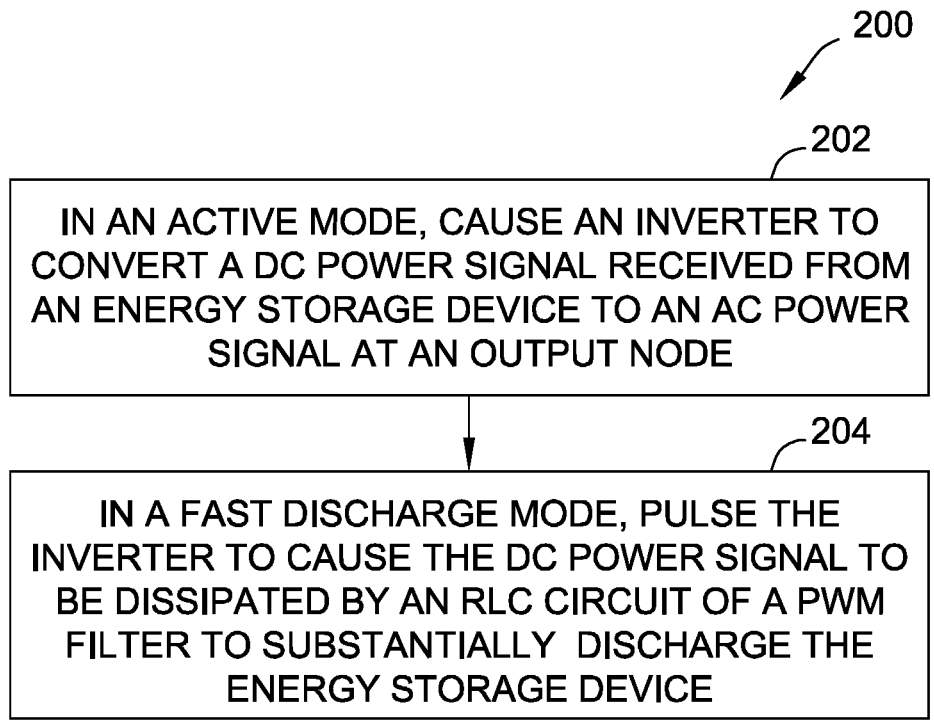

These and other features, aspects, and advantages of the present disclosure will become better understood when the following detailed description is read with reference to the accompanying drawings in which like characters represent like parts throughout the drawings, wherein:

FIG. 1 is a block diagram of an power converter system.
FIG. 2 is a flowchart of an example method for discharging an energy storage device.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a power converter system including an energy storage device electrically coupled to a DC power source. The DC power source may be, for example, a photovoltaic cell or a battery energy storage system, and the energy storage device is configured to store electrical energy received from the DC power source. The power converter system further includes an inverter electrically coupled to the energy storage device, and a PWM filter electrically coupled to the inverter. The PWM filter includes an RLC circuit. The power converter system further includes a controller coupled in communication with the inverter. The controller is configured to, in an active mode, cause the inverter to convert a DC power signal received from the energy storage device to an AC power signal at an output node of the PWM filter, for example, to supply AC power to a power grid. The controller is further configured to, in a fast discharge mode, pulse the inverter to cause the DC power signal to be dissipated by the RLC circuit of the PWM filter to substantially discharge the energy storage device. By doing so, the energy storage device may be discharged relatively quickly without the need for the addition of dedicated fast discharge circuitry to the power converter system.

FIG. 1 is a schematic diagram illustrating an example power converter system 100. In the example embodiment, power converter system 100 is between a power source 102 and a grid 104, and is configured to convert DC power provided by power source 102 to AC power for grid 104. The AC power may be, for example, a 50 hertz or 60 hertz system. Power source 102 may be, for example, one or more photovoltaic cells, one or more wind turbines, one or more energy storage batteries, and/or another device capable of generating DC power. Power converter system 100 includes an energy storage device 106, an inverter 108, a PWM filter 110, a passive discharge circuit 112, and a plurality of voltage sensors 114. In some embodiments, power converter system 100 is coupled to power source 102 via a DC cutoff switch 116 and to grid 104 via an AC cutoff switch 118, which may be used to selectively decouple power converter system 100 from power source 102 and grid 104.

Energy storage device 106 is coupled to power source 102 and is configured to store electrical energy provided by power source 102. As shown in FIG. 1, energy storage device 106 may include one or more capacitors 120. Additionally, or alternatively, energy storage device 106 may include one or more battery cells, fuel cells, and/or other devices capable of storing electrical energy in response to an application of DC power. When power source 102 becomes inactive or is decoupled from energy storage device 106, energy storage device 106 retains a DC voltage, which may be used for powering, for example, grid 104. The AC power may be, for example, a 50 or 60 hertz system.

In some cases, energy storage device 106 may require periodic maintenance, or a fault condition may occur that requires manual interaction with energy storage device 106. In such cases, energy storage device 106 generally should be discharged, so that personnel performing maintenance on energy storage device 106 are not exposed to dangerous voltages such as, for example, voltages exceeding 50 volts. A state where energy storage device 106 is discharged sufficiently so that personnel can safely interact with energy storage device, for example, when the voltage of energy storage device 106 has fallen below 50 volts, is sometimes referred to herein as energy storage device 106 being "substantially discharged." In some embodiments, one or more of voltage sensors 114 are coupled across energy storage device 106 or capacitors 120 and may be used to measure a voltage of energy storage device 106 to determine whether energy storage device 106 is discharged.

Inverter 108 is electrically coupled to energy storage device 106. Inverter 108 includes a plurality of switches such as, for example, insulated gate bipolar transistor (IGBT) switches, that may be opened or closed to generate a desired waveform at an output node 122. In some embodiments, inverter 108 is of a two-level or three-level neutral point clamped (NPC) or neutral point piloted (NPP) type. PWM filter 110 is coupled to inverter 108, and includes an RLC circuit, represented in FIG. 1 by a resistor 124, an inductor 126, and a capacitor 128. In some embodiments, resistor 124, inductor 126, and capacitor 128 are implemented using one or more lump components, distributed components, or a combination thereof. Inverter 108 is configured to pulse switches to generate a PWM waveform that in turn generates a desired AC output signal at output node 122. Accordingly, inverter 108 and PWM filter 110 convert a DC power signal provided by energy storage device 106 into an AC power signal that may in turn be provided to grid 104. A mode where inverter 108 is providing the AC power signal to grid 104 is sometimes referred to herein as the "active mode."

In addition to the active mode, inverter 108 is configured to operate in a "fast discharge mode." In the fast discharge mode, power converter system 100 is decoupled from power source 102 and grid 104, and inverter 108 pulses so that energy stored in energy storage device 106 may be dissipated via PWM filter 110, for example, by resistor 124. In some embodiments, by pulsing inverter 108, energy storage device 106 may be substantially discharged in a few seconds. The rate at which energy storage device 106 may be discharged in the fast discharge mode depends in part on a resistance of resistor 124, a capacitance of energy storage device 106, and/or a rate at which inverter 108 is pulsed. The rate at which energy storage device 106 is discharged may be limited by the rate at which resistor 124 can effectively dissipate electrical energy, for example, as heat energy, without sustaining damage or becoming dangerously hot. In some embodiments, power converter system 100 may automatically enter the fast discharge mode in response to detection of a fault.

In some embodiments, power converter system 100 further includes passive discharge circuit 112. Passive discharge circuit 112 is electrically coupled in parallel with energy storage device 106, and includes one or more discharge resistors 130, which may be implemented as, for example, a resistor bank. Passive discharge circuit 112 remains coupled to energy storage device 106 while inverter 108 is in the active mode. Accordingly, passive discharge circuit 112 has a sufficiently high resistance that a relatively small amount of energy is dissipated by passive discharge circuit 112 in the active mode, enabling more power to be transferred to grid 104. When inverter 108 is inactive, however, energy is dissipated via passive discharge circuit 112 such that energy storage device 106 becomes discharged, albeit at a slower rate than when inverter 108 operates in the fast discharge mode. For example, in some embodiments, passive discharge circuit 112 causes energy storage device 106 to substantially discharge in more than thirty minutes, depending on passive circuit resistance value, when inverter 108 is inactive.

In some embodiments one or more of inverter 108, DC cutoff switch 116, and AC cutoff switch 118 are controlled by a controller 132. Controller 132 may include, for example, a processor coupled in communication with the one or more of inverter 108, DC cutoff switch 116, and AC cutoff switch 118, and a memory configured to store computer-executable instructions, that when executed by the processor, cause the processor to operate power converter system 100 as described herein.

FIG. 2 is a flowchart illustrating an example method 200 for discharging an energy storage device such as energy storage device 106 (shown in FIG. 1). In some embodiments, method 200 is performed by power converter system 100 (shown in FIG. 1) using, for example, controller 132.

Method 200 includes, in an active mode, causing 202 an inverter (such as inverter 108) to convert a DC power signal received from an energy storage device (such as energy storage device 106) to an a AC power signal at an output node (such as output node 122) of a PWM filter (such as PWM filter 110). In certain embodiments, inverter 108 includes an NPC type invertor or an NPP type inverter. In some embodiment, the inverter includes at least one IGBT switch. In certain embodiments, the energy storage device receives energy from at least one of a photovoltaic cell and a battery cell.

Method 200 further includes, in a fast discharge mode, pulsing 204 the inverter to cause the DC power signal to be dissipated by an RLC circuit of the PWM filter to substantially discharge the energy storage device.

In some embodiments, the power converter system further includes an AC cutoff switch (such as AC cutoff switch 118) electrically coupled to the output node. In such embodiments, method 200 further includes, when in the active mode, causing the AC cutoff switch to couple the output node to a power grid to provide the AC power signal to the power grid, and when in the fast discharge mode, causing the AC cutoff switch to decouple the output node from the power grid.

In some embodiments, the power converter system further includes a DC cutoff switch (such as DC cutoff switch 116) electrically coupled between the power source and the energy storage device. In such embodiments, method 200 further includes, when in the active mode, causing the DC cutoff switch to couple the power source to the energy storage device, and when in the fast discharge mode, causing the DC cutoff switch to decouple the power source from the energy storage device.

In some embodiments, the power converter system further includes a passive discharge circuit (such as passive discharge circuit 112) electrically coupled in parallel with the energy storage device. In such embodiments, method 200 further includes dissipating, by the passive discharge circuit, electrical energy stored in the energy storage device.

In some embodiments, the power converter system further includes one or more voltages sensors (such as voltage sensors 114), and method 200 further includes measuring, using at least one of the one or more voltage sensors, a voltage of the energy storage device.

In some embodiments, method 200 further includes detecting a fault condition present at the inverter and deactivating the inverter in response to detecting the fault condition. For example, if a fault is detected at inverter 108, inverter 108 may be deactivated and energy storage device 106 may be allowed to slowly discharge via passive discharge circuit 112.

An example technical effect of the methods, systems, and apparatus described herein includes at least one of: (a) reducing discharge time for an energy storage device in a power converter system by pulsing an inverter of the power converter system to dissipate energy via a PWM filter of the power converter system; and (b) reducing a cost of a power converter system by discharging an energy storage system of the power converter system by using an inverter of the power converter system to dissipate energy via a PWM filter of the power converter system.

Example embodiments of a system for discharging an energy storage device are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiment can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter system comprising:
an energy storage device electrically coupled to a direct current (DC) power source, said energy storage device configured to store electrical energy received from the DC power source;
an inverter electrically coupled to said energy storage device;
a pulse width modulation (PWM) filter electrically coupled to said inverter, said PWM filter comprising a resistor inductor capacitor (RLC) circuit;
a passive discharge circuit electrically coupled in parallel with said energy storage device, said passive discharge circuit including a plurality of discharge resistors arranged in series with one another and implemented as a resistor bank; and
a controller coupled in communication with said inverter, said controller configured to:
in an active mode, cause said inverter to convert a DC power signal received from said energy storage device to an alternating current (AC) power signal at an output node of said PWM filter; and in a fast discharge mode, pulse said inverter to cause the DC power signal to be dissipated by said RLC circuit of said PWM filter, discharging said energy storage device to a safety level, wherein said passive discharge circuit is configured to dissipate electrical energy stored in said energy storage device.

2. The power converter system of claim 1, further comprising an AC cutoff switch electrically coupled to the output node, wherein said controller is further configured to:

when in the active mode, cause said AC cutoff switch to couple the output node to a power grid to provide the AC power signal to the power grid; and when in the fast discharge mode, cause said AC cutoff switch to decouple the output node from the power grid.

3. The power converter system of claim 1, further comprising a DC cutoff switch electrically coupled between the DC power source and said energy storage device, wherein said controller is further configured to:

when in the active mode, cause said DC cutoff switch to couple the DC power source to said energy storage device; and when in the fast discharge mode, cause said DC cutoff switch to decouple the DC power source from said energy storage device.

4. The power converter system of claim 1, further comprising one or more voltages sensors, at least one of the one or more voltage sensors configured to measure a voltage of said energy storage device.

5. The power converter system of claim 1, wherein said controller is further configured to:

detect a fault condition present at said inverter; and deactivate said inverter in response to detecting the fault condition.

6. The power converter system of claim 1, wherein said inverter comprises a neutral point clamped (NPC) type invertor or a neutral point piloted (NPP) type inverter.

7. The power converter system of claim 1, wherein the DC power source includes at least one of a photovoltaic cell and a battery cell.

8. A method for discharging an energy storage device, said method performed by a power converter system including the energy storage device electrically coupled to a direct current (DC) power source and configured to store electrical energy received from the DC power source, an inverter electrically coupled to the energy storage device, a pulse width modulation (PWM) filter electrically coupled to the inverter and including a resistor inductor capacitor (RLC) circuit and a passive discharge circuit electrically coupled in parallel with the energy storage device, the passive discharge circuit including a plurality of discharge resistors arranged in series with one another and implemented as a resistor bank, said method comprising:

in an active mode, causing the inverter to convert a DC power signal received from the energy storage device to an alternating current (AC) power signal at an output node of the PWM filter;

in a fast discharge mode, pulsing the inverter to cause the DC power signal to be dissipated by the RLC circuit of the PWM filter, discharging the energy storage device to a safety level; and dissipating, by the passive discharge circuit, electrical energy stored on the energy storage device.

9. The method of claim 8, wherein the power converter system further includes an AC cutoff switch electrically coupled to the output node, and wherein said method further comprises:

when in the active mode, causing the AC cutoff switch to couple the output node to a power grid to provide the AC power signal to the power grid; and when in the fast discharge mode, causing the AC cutoff switch to decouple the output node from the power grid.

10. The method of claim 8, wherein the power converter system further includes a DC cutoff switch electrically coupled between the DC power source and the energy storage device, and wherein said method further comprises:

when in the active mode, causing the DC cutoff switch to couple the DC power source to the energy storage device; and when in the fast discharge mode, causing the DC cutoff switch to decouple the DC power source from the energy storage device.

11. The method of claim 8, wherein the power converter system further includes one or more voltages sensors, and wherein said method further comprises measuring, by at least one of the one or more voltage sensors, a voltage of the energy storage device.

12. The method of claim 8, further comprising:

detecting a fault condition present at the inverter; and deactivating the inverter in response to detecting the fault condition.

13. A controller for a power converter system, the power converter system including an energy storage device electrically coupled to a direct current (DC) power source and configured to store electrical energy received from the DC power source, an inverter electrically coupled to the energy storage device, a pulse width modulation (PWM) filter electrically coupled to the inverter and including a resistor inductor capacitor (RLC) circuit and a passive discharge circuit electrically coupled in parallel with the energy storage device, the passive discharge circuit including a plurality of discharge resistors arranged in series with one another and implemented as a resistor bank, said controller configured to:

in an active mode, cause the inverter to convert a DC power signal received from the energy storage device to an alternating current (AC) power signal at an output node of the PWM filter; and in a fast discharge mode, pulse the inverter to cause the DC power signal to be dissipated by the RLC circuit of the PWM filter, discharging the energy storage device to a safety level.

14. The controller of claim 13, wherein the power converter system further includes an AC cutoff switch electrically coupled to the output node, and wherein said controller is further configured to:

when in the active mode, cause the AC cutoff switch to couple the output node to a power grid to provide the AC power signal to the power grid; and when in the fast discharge mode, cause the AC cutoff switch to decouple the output node from the power grid.

15. The controller of claim 13, wherein the power converter system further includes a DC cutoff switch electrically coupled between the DC power source and the energy storage device, and wherein said controller is further configured to:

when in the active mode, cause the DC cutoff switch to couple the DC power source to said energy storage device; and when in the fast discharge mode, cause said DC cutoff switch to decouple the DC power source from said energy storage device.

16. The controller of claim 13, further comprising one or more voltages sensors coupled in communication with said controller, at least one of the one or more voltage sensors configured to measure a voltage of said energy storage device.

17. The controller of claim 13, further configured to:
detect a fault condition present at said inverter; and
deactivate said inverter in response to detecting the fault condition.

18. The controller of claim 13, wherein the DC power source includes at least one of a photovoltaic cell and a battery cell.

* * * * *